Sept. 15, 1964           H. E. PICKRELL, JR                3,148,784
                      GENERAL PURPOSE CARGO VESSEL
Filed Sept. 16, 1960                              3 Sheets-Sheet 1
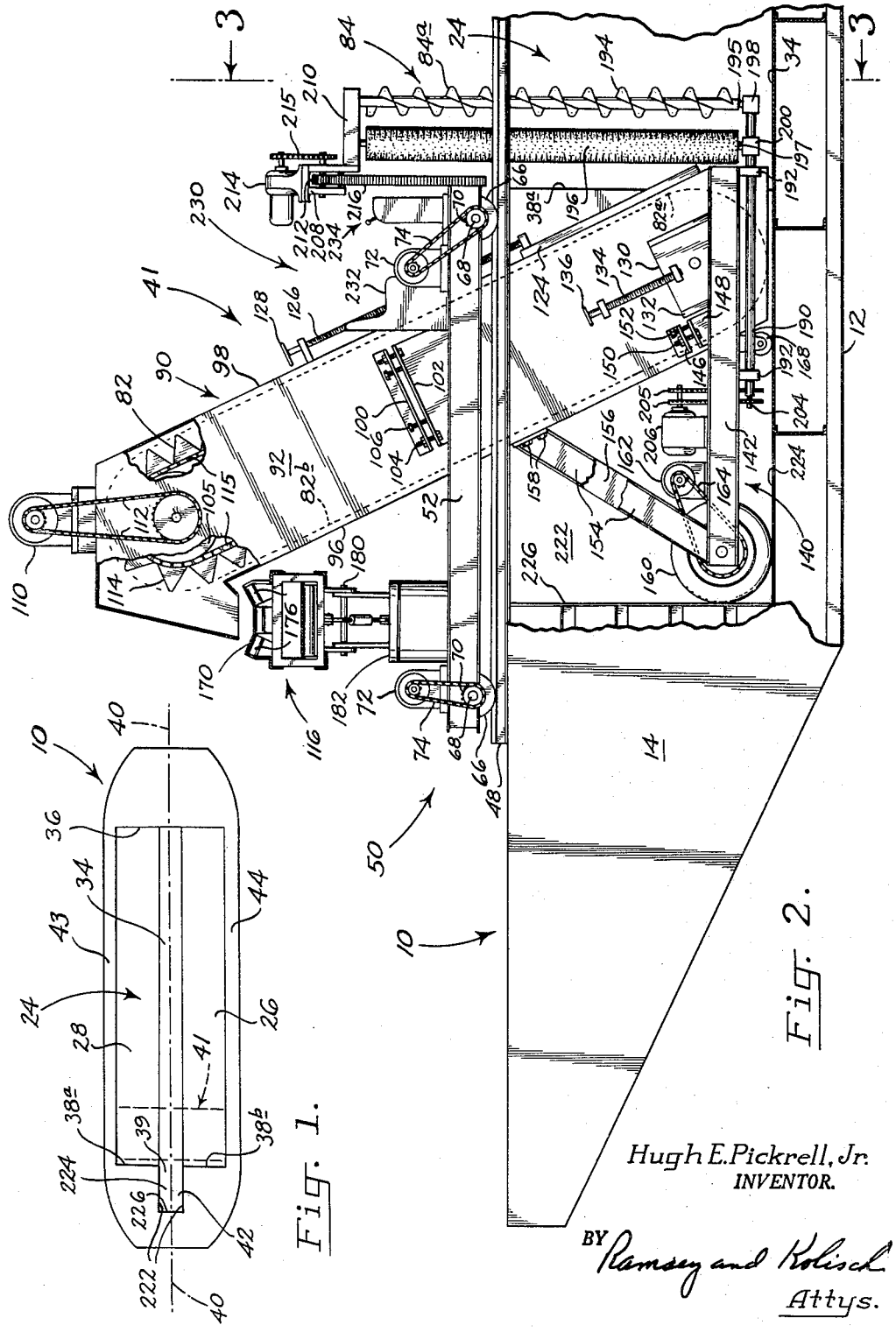
Hugh E. Pickrell, Jr.
INVENTOR.
BY Ramsey and Kolisch
                Attys.

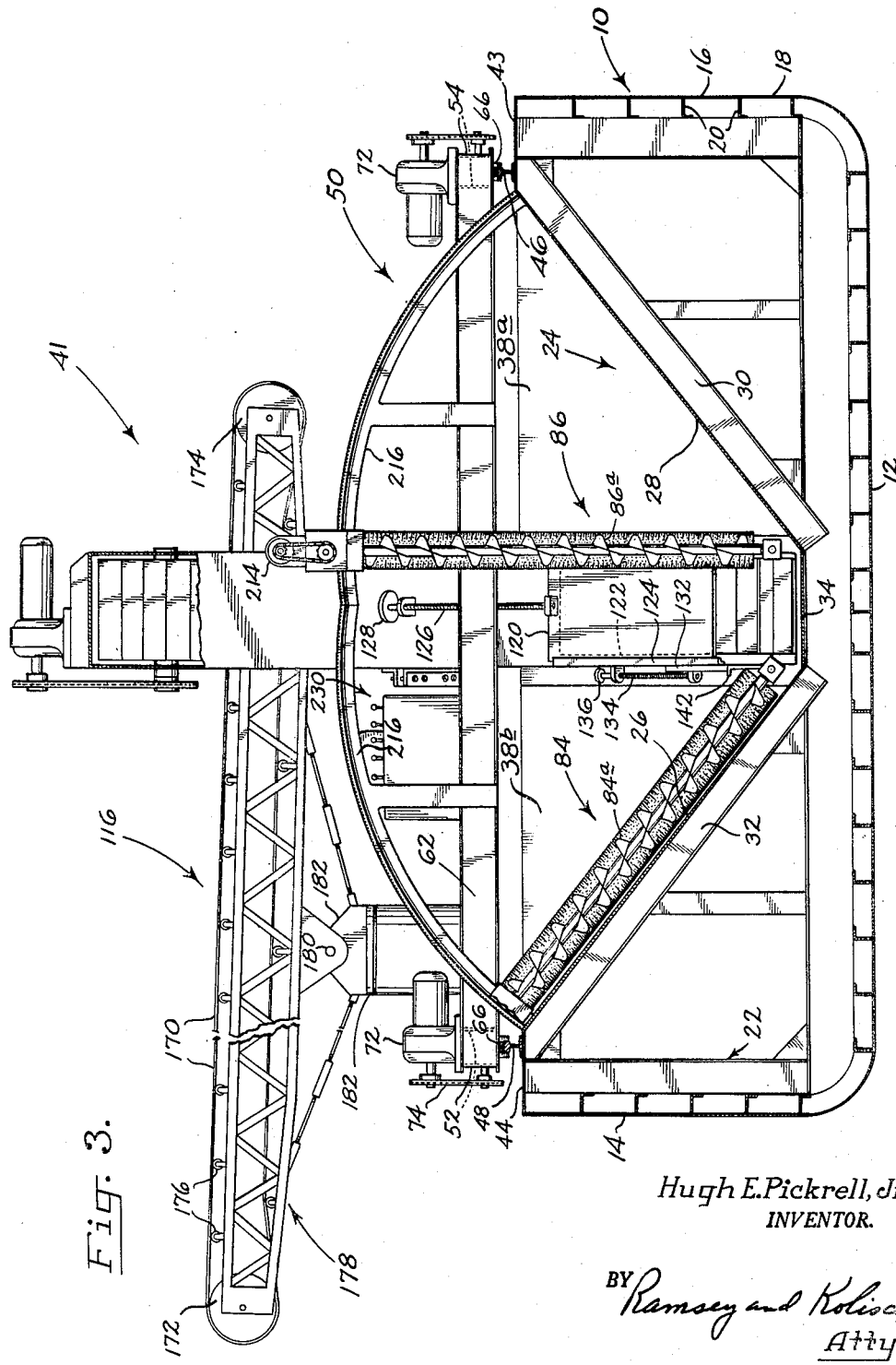

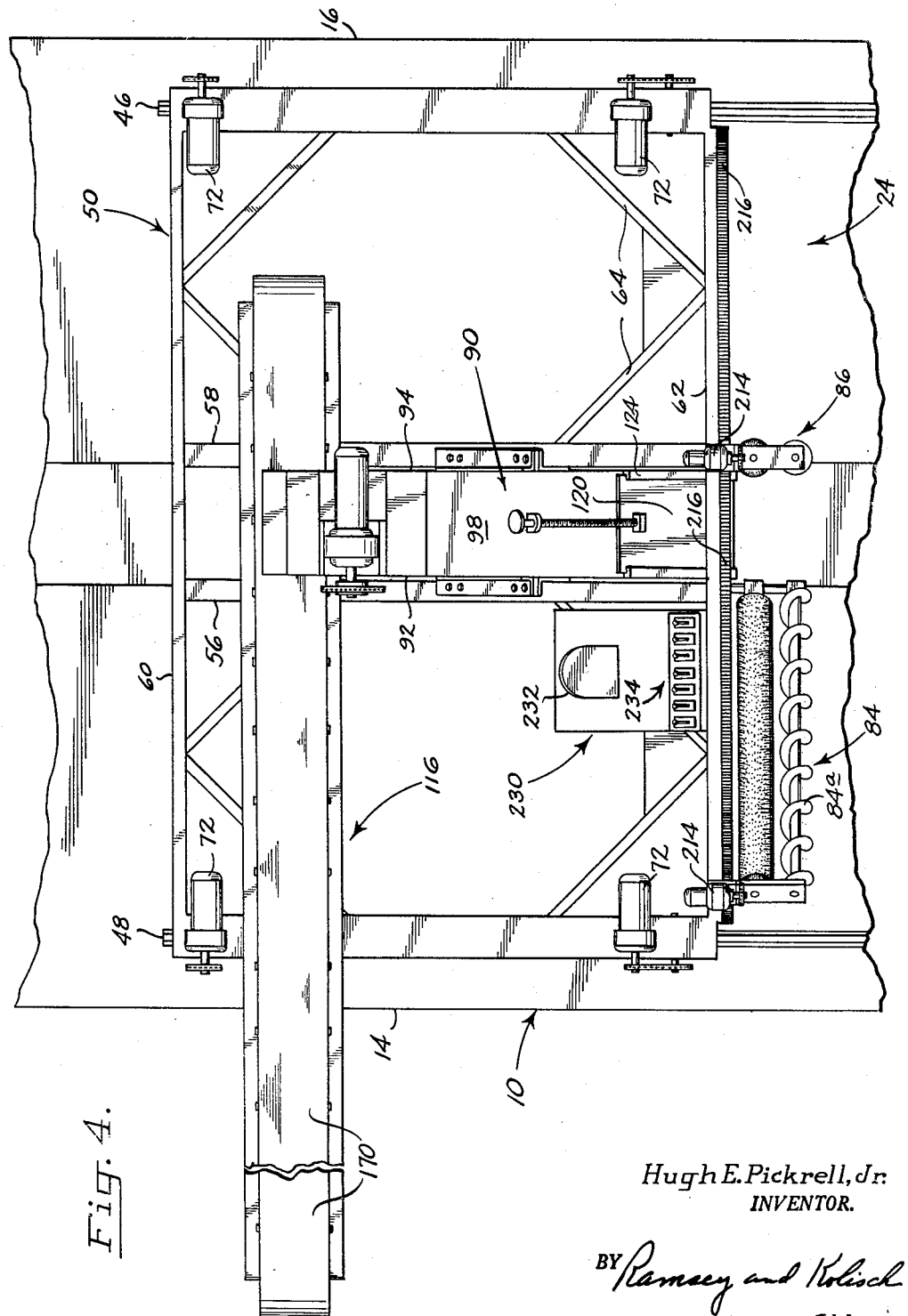

United States Patent Office 3,148,784
Patented Sept. 15, 1964

3,148,784
GENERAL PURPOSE CARGO VESSEL
Hugh E. Pickrell, Jr., Vancouver, Wash., assignor to R.P.T.Z. Patco Inc., Portland, Oreg., a corporation of Oregon
Filed Sept. 16, 1960, Ser. No. 56,389
3 Claims. (Cl. 214—15)

This invention relates to cargo vessels, and to novel mechanism carried by such a vessel for unloading the same. A vessel constructed according to the invention can carry a wide variety of particulate materials, exemplified by such materials as salt, grain, sawdust, etc. The vessel is referred to herein as a self-unloading, general purpose cargo vessel, because of the fact that it can transport and then unload from itself so many different types of cargos.

A cargo vessel, such as a barge, that can handle a variety of materials with equal facility has obvious advantages. The rapidity with which a vessel can be unloaded is an important factor in determining what a vessel can handle efficiently, since the time spent in unloading has a direct effect on the tonnage that the vessel can move over a given period of time. Not only is it advantageous to have a vessel that can be unloaded rapidly, but it is also preferable that the unloading operation be substantially automatic, so that labor costs can be minimized.

Different types of self-unloading barges have been developed in the past. While these have worked satisfactorily with certain types of cargos, a common drawback of most constructions proposed to date is that with certain other types of cargos the unloading mechanism of the barge is, as a practical matter, unworkable. As a result, it has been a tendency to design vessels or barges for specific types of cargo, which has limited their usefulness.

Generally, an object of the invention is to provide an improved, general purpose, self-unloading barge that can handle efficiently substantially any type of pulverant, comminuted, or particulate material, including such materials as salt, wheat, limerock, coal, sand, gravel, sawdust, etc.

As contemplated by an embodiment of this invention, the cargo vessel comprises a hull, and extending along the length of and within the hull an elongated bin for cargo. Movable along the length of the bin is mechanical agitator and conveyor means, that extends upwardly from the bottom of the bin to the top thereof. The mechanical agitator and conveyor means comprises, along each side of the bin, a rotatable auger mechanism that extends upwardly from the bottom of the bin and can be operated to break apart material encountered thereby and pull such downwardly toward the bin bottom. The means also comprises, centrally of the sides of the bin and extending upwardly from the bin bottom, an elongated bucket conveyer mechanism, that operates when actuated to scoop up material encountered by the mechanism and lift it upwardly to the top of the bin, where a transfer conveyer is provided for the purpose of carrying such material laterally to one side of the vessel. The bucket conveyer inclines rearwardly from a forward position located adjacent the base of the bin, that can be considered as the lead or toe portion of the conveyer. The bucket conveyer is movable along the midline of the vessel, and when the lead or toe portion is advanced into a cargo, it starts to form a vertical trench in the cargo progressing upwardly from the bottom of the bin. The auger mechanisms on either side then can be used to cascade material downwardly toward the toe portion of the bucket conveyer, where it can be picked up and removed. A rotatable brush mechanism is provided each auger mechanism that substantially parallels the auger mechanism and that travels behind it. The brush mechanisms promote complete cleaning of the side walls during the unloading operation.

Thus, important in considering the invention is the concept of a novel method where trenching and cascading in from the sides is relied upon in the unloading of a vessel. One form of previously known construction has employed, for instance, devices such as clam shells that are drawn over the top of a load to scoop off material while reducing it in size. Another form of unloader known in the art has used some sort of conveyer system at the base of a bin for drawing material from out of the bottom of the bin. The former type of system is difficult to operate automatically, and the latter type has been subject to the very serious disadvantage that bridging of any material handled renders it ineffectual. According to this invention, where a vertical trench is cut into the material along the midline of the vessel by digging in near the base of the bin and vertically upwardly therefrom, bridging is automatically prevented. The buckets of the bucket conveyer remove material from which the trench is formed (by lifting such material upwardly), and also remove material that cascades down the sides of the bin. Such cascading action may be augmented by operation of the augers disposed along the sides of the bin. Material that bridges and cakes is handled as well as ordinarily flowable material.

Thus, a more specific object is to provide an improved method for unloading a bin in a cargo vessel, which relies on cutting a vertical trench progressing into the base of the material, and removing such material while the trench forms, while also cascading material down from the sides of the forming trench and removing such cascading material.

Another object is to provide a vessel having a cargo bin with unloading mechanism which comprises agitator and conveyer mechanism movable along the length of the bin, such including bucket conveyer mechanism extending upwardly from the base of the bin operable to cut into, break apart, and remove material from the bin.

A further object is to provide a self-unloading cargo vessel including agitator and conveyer mechanism (with bucket conveyer mechanism of the type described) which also has extending upwardly along the sides of the bin auger mechanism operable to pull material down the sides and into the toe or lead portion of the bucket conveyer mechanism.

A further object is to provide such a vessel where the auger mechanisms at the sides of the bin are movable in sweeps about axes extending longitudinally of the vessel adjacent the base of the bin, with the tops of the auger mechanisms movable in arcs between sides of the bin whereby they may be used most effectively to break banks or bridges in the cargo.

A further object of the invention is to provide a self-unloading cargo vessel that, in addition to the auger mechanisms described, also includes rotatable brush mechanisms paralleling the auger mechanisms and disposed behind them, whereby the sides of a bin may be brushed clean during the unloading operation, best to prepare it for the handling of a subsequent cargo. Obviously, the cleaner the bin in a vessel, the less time that need be spent in preparing the bin for the next cargo.

Other objects and advantages are attained by the invention, and the same is described hereinbelow in conjunction with the accompanying drawings, wherein:

FIG. 1 illustrates, in a simplified drawing, the plan of a barge constructed as contemplated by the invention;

FIG. 2 illustrates the stern of the barge in FIG. 1, in an enlarged scale, with the unloading mechanism contemplated by the invention positioned adjacent the stern, and with portions of the hull broken away;

FIG. 3 is a cross-sectional view, taken along the line

3—3 in FIG. 2, viewing the forward end of the unloading mechanism; and

FIG. 4 is a top view of the unloading mechanism and barge illustrated in FIGS. 2 and 3.

Referring now to the drawings, 10 indicates a conventional type of hull for a barge, such hull including a bottom 12 and sides 14 and 16. As is usual in hull constructions, the sides and bottom are defined by plating, such as plating 18, secured to longitudinals 20. The latter longitudinals are supported at regular intervals along the length of the hull by suitable transversely extending frame sections, such as the one indicated in FIG. 3 at 22. At the stern of the vessel (illustrated in FIG. 2) bottom 12 slopes upwardly, and a similar rake may be provided at the bow of the vessel (not shown).

Extending longitudinally along the length of hull 10 and between sides 14 and 16 is an elongated bin 24. The bin is defined by sloping side walls 26, 28 supported on beams 30, 32, that are joined to and are part of the frame sections. Side walls 26, 28 converge on each other progressing downwardly within the hull, and bottom margins of the side walls are joined by a bottom 34 for the bin. Closing off the forward end of bin 24 is the usual vertical, transversely extending bulkhead 36, and defining the rear limits of the bin are bulkhead portions 38a, 38b. These are also vertical and extend in a transverse direction between sides 26, 28. Between bulkhead portions 38a, 38b is a vertical opening 39 extending upwardly from the midline 40 of the vessel. Such opening provides for the retraction therethrough of agitator and conveyor mechanism 41 into a chamber 42 provided at the stern of the vessel, as will be described in more detail hereinbelow.

Adjacent the top of the bin and extending along either side of the hull are elongated, relatively narrow deck portions 43, 44. Supported on these deck portions and extending substantially the length of the bin are a pair of rails or guide means 46, 48. The rails provide support for a carriage, indicated generally at 50, which is mounted for movement lengthwise of the vessel over the top of bin 24 on the rails.

Carriage 50 comprises a framework made up of paired longitudinals 52 on one side and paired longitudinals 54 on the other side thereof, and middle longitudinals 56, 58, secured together at their ends by transversely extending beams 60, 62. Making the frame rigid are diagonal braces 64. The carriage is supported on rails 46, 48 by flanged wheels 66 journaled on one side of the carriage between paired longitudinals 52, and on the other side of the carriage between paired longitudinals 54. Each wheel is secured to a wheel shaft 68 that extends outwardly from the wheel having a sprocket 70 secured thereto. A power-operated means or motor 72 mounted on the carriage adjacent each of its corners is connected to each wheel to drive it by means of a chain belt 74 trained over sprocket 70. Thus, the wheels not only support the carriage, but also provide a means for moving it back and forth, when power is supplied the various motors 72.

Agitator and conveyor means or mechanism 41 is mounted on the carriage for movement therewith longitudinally of the hull. Means 41 comprises a bucket conveyer 82 extending upwardly from the base of the bin over the midline of the boat, and a pair of auger mechanisms 84, 86. The bucket conveyer and auger mechanisms, when they are advanced into a bank of material disposed in front thereof, act to break such bank of material apart and then remove it, as will now be described more specifically below.

Considering bucket conveyer 82, 90 indicates an elongated hollow metal casing, having side walls 92, 94 facing the two sides of the hull and side walls 96, 98 facing the stern and bow, respectively. The casing has a substantially rectangular cross section, and inclines toward the stern of the boat progressing upwardly from the bottom of the bin. The casing encloses bucket conveyer 82 on all sides. Mounting casing 90 on carriage 50 are complementing brackets 100, 102. A set of these are provided on each of the lateral sides of the casing. Bracket 100 is secured to the casing side wall, and bracket 102 is joined to one of the middle longitudinals 56, 58. The brackets are connected together by nut and bolt assemblies 104. Screws 106 screwed into bracket 100 and with ends abutting bracket 102 may be adjusted to make small changes in the position of the casing relative to carriage 50 (as when changing the spacing of the bottom of the bucket conveyer with respect to bin floor 34). Such adjustment may be desirable in order to obtain most efficient unloading for various types of cargos.

Bucket conveyer 82 in casing 90 has a forward run 82a that starts adjacent the bottom of the bin at a toe or lead portion of the conveyer and inclines from this toe or lead portion upwardly and rearwardly. A return run is indicated at 82b that parallels forward run 82a. The bucket conveyer is trained over sprockets 105 at the top and bottom of the conveyer. The sprockets are journaled in the side walls of casing 90. A motor 110 mounted on top of the casing drives the bucket conveyer through a drive chain 112.

Included in the bucket conveyer are buckets 114, constituting holding devices for the conveyer carried on continuous chain belts 115. The conveyer is driven by the power-operated means or motor 110 in a counterclockwise direction in FIG. 2, with the buckets picking up material at the base of the bin. Material drops out of the buckets when they start downwardly along return run 82b, and such material falls onto a laterally extending transfer conveyer, indicated generally at 116. The buckets thus are empty when they are returned to the bottom of the bin.

Wall 98 of casing 90 is provided with a door or gate 120 closing off a feed opening 122 that extends, from the base of wall 98, upwardly. Door 120 may be slid upwardly in ways or guides 124 by turning adjustment screw 126 and using handle 128. The door is slid upwardly to uncover all or part of opening 122 when it is desired to expose a greater number of buckets 114 of the bucket conveyer, during their upward travel, to material in the bin. With opening 122 completely uncovered, the buckets may function along the entire length of the opening to break apart and carry away any material in the bin with which they come in contact. This is desirable with materials that cake and bridge excessively. With freely flowing material, where caking and bridging is not so much of a problem, the door is positioned relatively close to the bottom of the bin, and in this position regulates the flow of material to the buckets by inhibiting too fast a flow of material thereto.

Side walls 92, 94 of the casing that face the sides of the hull also are provided with openings closed by doors such as door 130 slidable in guide 132 and adjusted in position by means of adjuster screw 134 and handle 136. Ordinarily feed to the bucket conveyer is to the front of the conveyer through opening 122, but in some instances it may be desirable to feed through the sides of the conveyer by side openings. When this is the case, doors 130 are raised to expose lower side portions of the bucket conveyer.

Casing 90 and the bucket conveyer mounted therein are supported on the floor or bottom 34 of the bin by means of a subcarriage or support means 140. Subcarriage 140 comprises a member 142 on each side of casing 90 paralleling middle longitudinals 56, 58 and secured to the casing. The connection of the subcarriage with the casing is by means that accommodates relative vertical shifting of the casing with respect to beams 142. In the embodiment illustrated, on each side of casing 90 there is provided a set of complementary brackets 146, 148. One of these (bracket 146) is secured to the casing and the other (bracket 148) is secured to a member 142. A nut and bolt assembly 150 extends through the paired brackets and secures them together. A screw 152 is threaded into the top bracket 146 with a lower end abutting the lower bracket, which screw is used to adjust the relative position of the brackets, as when adjusting the vertical position of casing 90.

In the embodiment illustrated, subcarriage 140 is also secured to the rear side wall 96 of the casing through struts 154, 156 extending up from the subcarriage. Nut and bolt assemblies 158 connect the struts to the casing, and these extend through accommodating slots formed in rear side wall 96 that enable relative vertical shifting of the casing with respect to the ends of struts 154, 156.

The subcarriage is supported for rolling movement over floor 34 of the bin by wheel 160. Wheel 160 may take the form of a conventional pneumatic tire journaled between members 142. Power-operated means or motor 162 is connected to the wheel to drive the wheel by a drive belt 164. Support wheels 168 may also be included underneath forward portions of members 142 to provide rolling support for the forward end. As already noted, carriage 50 may be advanced and retracted over guides or rails 46, 48 by selective actuation of motors 72, and this results in travel of the bucket conveyer and casing 90. It is sometimes desirable to impart a greater forward thrust to the toe or lead portions of the bucket conveyer than is possible relying only on motors 72, and when this is so motor 162 is energized. Motor 162 may also be used alone and without relying on motors 72 to produce forward travel of the bucket conveyer.

Considering transfer conveyer 116, this comprises an elongated, continuous conveyer belt 170 trained over pulleys 172, 174 and supported intermediate its ends on rollers, such as rollers 176. The pulleys and rollers are mounted on a supporting truss 178. Truss 178 is pivotally supported by pivot connection 180 on a turntable 182. The latter accommodates swinging of the truss about an upright axis, whereby the transfer conveyer may be positioned to extend transversely of the hull as shown in the drawings, or positioned so as to extend longitudinally of the hull. A motor (not shown) is provided for turning turntable 182. By swinging the truss to a position extending longitudinally of the hull, the transfer conveyer may be swung out of the way when the boat is under way. In the transverse position shown, the transfer conveyer receives material from the bucket conveyer and transports it to one side of the hull where it may be collected in any suitable manner.

Continuing with the description of agitator and conveyer means 41, beneath each member 142 of subcarriage 140 and extending forwardly of the lower end of casing 90 is a tubular shaft housing 190. Each is journaled on the underside of a frame member 142 using bearings 192. Auger mechanisms 84, 86 previously described are adjacent the forward extremities of these shaft housings and extend upwardly therefrom. A rotatable brush mechanism 196 is provided behind each auger mechanism substantially paralleling the auger mechanism in front of it. Shafts 195, 197 of each set of auger and brush mechanisms are connected through the gears of gear boxes 198, 200 to a drive shaft 204 rotatably disposed within shaft housing 190. Drive shafts 204 are connected by chains 205 to the motor shaft of an electric motor 206 mounted behind casing 90 on subcarriage 140. Motor 206 constitutes a power-operated means that is operable when actuated to produce rotation of the two sets of auger and brush mechanisms disposed on either side of bin 24.

Tubular shaft housings 190 as indicated above, are journaled beneath members 142, and thus they are rotatable relative to members 142 about axes extending longitudinally of the vessel that coincide with the longitudinal axes of the shaft housings. The shaft housings function as mountings for the bottom ends of the auger and brush mechanisms, and by reasons of their rotatability, each set of auger and brush mechanisms is pivotable about the rotation axis of the housing connected thereto, with the top ends of the mechanisms in the set swingable in an arc extending transversely of the hull and between the sides of the bin.

Secured across the front of beam 62 of carriage 50 are a pair of arcuate rack members 216. Meshing with the teeth of each are the teeth of a pinion gear 212 (see FIG. 2). Each pinion gear is journaled in a mounting 208 that is connected to a support 210 rotatably mounting the upper ends of the shafts of a set of auger and brush mechanisms. A motor 214 carried on top of each mounting 208 is connected to the pinion gear journaled in the mounting to drive the pinion gear by a chain 215. Energizing of a motor 214 causes the pinion gear 212 driven by the motor to rotate, with swinging of the mounting 208 for the gear, the support 210 connected to the mounting, and the upper ends of the auger and brush mechanisms carried by the support. In this way, each set of auger and brush mechanisms can be made to swing about the pivot axis therefor, with the auger mechanism cutting into material it encounters. In FIG. 3, the left set of auger and brush mechanisms is shown swung to a position close to side 26 of bin 24, while the right set of auger and brush mechanisms is shown swung to a near vertical position. In all positions of each set of auger and brush mechanisms, the flights of the auger mechanism (indicated at 84a for mechanisms 84 and 86a for mechanisms 86) function to pull material that comes in contact therewith downwardly toward the bottom of the bin, when the auger mechanism is rotated by energizing of motor 206. In a position close to a side of the bin, the brush mechanism of a set of auger and brush mechanisms is rotated so as to produce sweeping of any material deposited on the side forwardly into the flights of the auger mechanisms directly in front thereof.

Considering again chamber 32 at the stern of the vessel, this is defined by sides 222, bottom 224 (which is an extension of bin bottom or floor 34), and a rear bulkhead 226. Sides 222 of the chamber are spaced apart approximately the distance of members 142 of subcarriage 140, enabling agitator and conveyer mechanism 41 to be retracted substantially completely into the chamber, with the walls of casing 90 substantially closing off the front of the chamber. During loading of the vessel, this retracted position of means 41 is its normal position. Agitator and conveyor means 41 is moved forwardly out of the chamber to start unloading, with clearing material from the bin as it progresses therealong.

Completing the description of the vessel of the invention, an operator's station is indicated at 230. Station 230 includes a seat 232 and controls generally indicated at 234 enabling an operator to regulate energizing of the various motors described.

Explaining the operation of the cargo vessel, to start removing a load of material from bin 24, motors 72 are energized which cause carriage 50 and the agitator and conveyer means supported thereon to advance into the material. If the material is a relatively free flowing one (such as dry grain), gate or door 120 is pulled up slightly to uncover the lower end of feed opening 122. This enables the material to fall toward the toe or lead portion of the bucket conveyer, with such material being scooped up by the buckets as the conveyer is advanced into the material. A trench starts to form along the midline of the vessel, and the material from which the trench is formed is deposited on the transfer conveyer. Further, as the trench forms, due to the slope of side walls 26, 28, material cascades down the walls and into the toe of the bucket conveyer, with this material also being removed. The sets of auger and brush mechanisms may be actuated, with the brush mechanisms sweeping clean the side walls, and the auger mechanisms pulling any material that may stick to the side walls down to the front of the bucket conveyer.

In the case of materials that bridge and cake excessively, such as salt, or perhaps wet sawdust, gate 120 may be slid upwardly to uncover substantially and completely opening 122 and to expose more of the buckets of the bucket conveyer. On forward movement of means 41, as the vertically moving buckets of the conveyer encounter any material, they act to break it up, and at the same time the buckets collect any loose material. Along the sides of the bin cascading of material is promoted by actuation of the auger and brush mechanisms described. In the event that excessive undercutting by the bucket conveyer occurs, and when it is desired to break apart bridged and caked material in advance of the bucket conveyer, the auger and brush mechanisms may be swung about the pivot axis described.

It will be noted that this invention contemplates a method and means for unloading cargo from a bin that works well with all types of particulate materials. Unloading of a vessel can be done with a minimum amount of labor and supervision. During unloading, the vessel can easily be kept in trim by suitable regulation of the auger mechanisms which control the flow rate of material down the sides of the bin.

I claim:

1. A cargo vessel comprising a hull with wall portions defining along the length thereof a bin for holding cargo, said bin having opposed sloping side walls converging on each other at the base of the bin, mechanical agitator means extending upwardly from the bottom of the bin, and a mounting for the agitator means accommodating its movement along the length of the hull and into a load of material carried within said bin, said agitator means comprising a rotatable auger mechanism extending upwardly along each side wall of the bin constructed to break apart material encountered by the same and to pull such material downwardly toward the bottom of the bin, said mounting for the agitator means including a pivot mounting for the base of each auger mechanism accommodating swinging of the mechanism about an axis adjacent the base of the auger mechanism and extending longitudinally of the hull and with the top of the auger mechanism swinging in an arc disposed between the sides of the bin.

2. A self-unloading cargo vessel comprising a hull with wall portions defining along the length thereof a bin for holding cargo, guide means adjacent the sides of the hull and the top of the bin extending substantially the length of the bin, one on each side of the bin, a carriage supported on said guide means for movement therealong, an endless bucket conveyer and means mounting the same on said carriage with a forward reach thereof extending upwardly from the bottom to the top of the bin between said guide means, said reach inclining rearwardly progressing upwardly from the bottom of the bin, auger mechanism extending upwardly along each side of the bin constructed on actuation to pull material downwardly along the side of the bin and toward the base of the forward reach of said bucket conveyer, and means mounting said auger mechanisms on said carriage, said means including, for each auger mechanism, means whereby it may be swung about a longitudinally extending axis located adjacent the base of the auger mechanism with the top of the auger mechanism swinging in an arc between the sides of the bin.

3. A cargo vessel comprising a hull with wall portions defining along the length thereof a bin for holding cargo, said bin having opposed sloping side walls and a bottom, mechanical agitator and conveyer means extending upwardly from the bottom of the bin, and a mounting for said agitator and conveyer means accommodating movement of the same along the length of the bin and progressively into the side of a load of material carried therewithin, said agitator and conveyer means comprising a rotatable auger mechanism extending upwardly along each side wall of the bin and constructed on actuation to pull material downwardly toward the bottom of the bin, a rotatable brush mechanism disposed rearwardly of and substantially paralleling each auger mechanism for brushing clean a side of the bin, and a belt and plural vertically movable holding devices mounted one after another on said belt and constructed to break apart material encountered by the same and to lift such material outwardly from the bin, said holding devices being carried by said belt to extend as a series upwardly from the bottom and midline of the bin.

References Cited in the file of this patent

UNITED STATES PATENTS

| | | |
|---|---|---|
| 247,783 | Schenck et al. | Oct. 4, 1881 |
| 265,592 | Fox | Oct. 10, 1882 |
| 708,395 | Peterson et al. | Sept. 2, 1902 |
| 794,526 | Maples | July 11, 1905 |
| 799,753 | O'Connor | Sept. 19, 1905 |
| 1,089,496 | Read | Mar. 10, 1914 |
| 1,574,143 | White | Feb. 23, 1926 |
| 1,808,873 | Weeks | June 9, 1931 |
| 1,829,923 | Cole | Nov. 3, 1931 |
| 2,037,959 | Bean | Apr. 21, 1936 |
| 2,417,111 | Jeoffroy | Mar. 11, 1947 |
| 2,532,249 | Ward | Nov. 28, 1950 |
| 2,690,850 | Welker | Oct. 5, 1954 |
| 2,893,574 | Bartenfeld | July 7, 1959 |

FOREIGN PATENTS

| | | |
|---|---|---|
| 408,222 | France | Mar. 12, 1910 |